United States Patent
Romero

(10) Patent No.: US 7,581,224 B2
(45) Date of Patent: Aug. 25, 2009

(54) SYSTEMS AND METHODS FOR MONITORING RESOURCE UTILIZATION AND APPLICATION PERFORMANCE

(75) Inventor: Francisco J. Romero, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 967 days.

(21) Appl. No.: 10/616,883

(22) Filed: Jul. 10, 2003

(65) Prior Publication Data

US 2005/0022185 A1 Jan. 27, 2005

(51) Int. Cl.
*G06F 9/46* (2006.01)
*G06F 15/16* (2006.01)
*G06F 15/173* (2006.01)

(52) U.S. Cl. .................... 718/104; 718/105; 709/201; 709/223; 709/224; 709/226

(58) Field of Classification Search ......... 718/100–108; 709/223–226, 201
See application file for complete search history.

(56) References Cited

U.S. PATENT DOCUMENTS

| | | | | |
|---|---|---|---|---|
| 5,655,081 A * | 8/1997 | Bonnell et al. | ............... | 709/202 |
| 5,958,009 A * | 9/1999 | Friedrich et al. | ............ | 709/224 |
| 6,088,801 A | 7/2000 | Grecsek | | |
| 6,671,724 B1 * | 12/2003 | Pandya et al. | ................ | 709/226 |
| 6,701,342 B1 * | 3/2004 | Bartz et al. | ................... | 709/200 |
| 6,738,813 B1 * | 5/2004 | Reichman | .................... | 709/224 |
| 6,816,905 B1 * | 11/2004 | Sheets et al. | ................. | 709/226 |
| 6,823,382 B2 * | 11/2004 | Stone | ......................... | 709/224 |
| 7,260,635 B2 * | 8/2007 | Pandya et al. | ................ | 709/226 |
| 2002/0016812 A1 | 2/2002 | Uchishiba et al. | | |
| 2002/0032768 A1 * | 3/2002 | Voskuil | ....................... | 709/224 |
| 2002/0065864 A1 * | 5/2002 | Hartsell et al. | .............. | 709/100 |
| 2002/0069279 A1 | 6/2002 | Romero et al. | | |
| 2002/0129127 A1 | 9/2002 | Romero et al. | | |
| 2002/0169680 A1 | 11/2002 | Becker et al. | | |
| 2002/0183972 A1 | 12/2002 | Erick et al. | | |
| 2002/0194251 A1 * | 12/2002 | Richter et al. | ............... | 709/105 |
| 2003/0115495 A1 | 6/2003 | Rawson, III | | |
| 2003/0126240 A1 * | 7/2003 | Vosseler | ..................... | 709/221 |
| 2004/0111725 A1 | 6/2004 | Srinivasan et al. | | |
| 2004/0221038 A1 * | 11/2004 | Clarke et al. | ................. | 709/226 |
| 2004/0243699 A1 * | 12/2004 | Koclanes et al. | ............ | 709/224 |
| 2006/0294238 A1 * | 12/2006 | Naik et al. | .................. | 709/226 |

OTHER PUBLICATIONS

Srinivasan et al., U.S. Appl. No. 60/426,962, "A Rule Based Dynamic Application and Server Management in a Resource-Shared Data Center", filed Nov. 8, 2002.*

(Continued)

*Primary Examiner*—Van H Nguyen
*Assistant Examiner*—Jennifer N To

(57) ABSTRACT

Systems and methods are disclosed for monitoring application performance. In one embodiment, the system comprises resource data including information on a plurality of resources, the resources including a plurality of computers, application data including one or more application profiles, each application profile having a performance profile and a resource profile, the resource profile including resource utilization information. The system further comprises policy data including one or more application performance policies and one or more resource utilization policies, and a monitoring agent to monitor the application data for compliance with the policy data.

31 Claims, 6 Drawing Sheets

OTHER PUBLICATIONS

Kumar et al., "A Resource Management Framework for Interactive Grids", HP Laboratorries, Jul. 8, 2003, pp. 1-8.*

Vraalsen, "Performance Contracts: Predicting and Monitoring Grid Application Behavior", Sintef Telecom and Informatics, Norway, Oct. 15, 2002, pp. 1-12.*

Sun Microsystems, Inc., White Paper, "Transforming the Economics of Computing", Optimizing IT Infrastructure Utilization, 2003, Chapters 1-5, pp. 1-10.

Sun Microsystems, Inc., White Paper, "N1—Introducing Just in Time Computing", An Executive Brief, 2002, 9 pages.

Sun Microsystems, Inc., N1 Technology Brief, "Th I-Fabric Architecture", A core component of Sun's Terraspring software, 2002, 2 pages.

IBM Think Research papers: 1) eWLM: Distributed Computing (2 pages); 2) eWLM: Managing Complexity (2 pages); 3) eWLM: Allocating for Efficiency (2 pages); 4) The Great Balancing Act (2 pages); and 5) eWLM: Autonomic Computing (3 pages); 2002, eWLM: Enterprise Workload Management.

IBM Presentation: Workload Management for e-Business: eWLM, Mike Smith, Apr. 1, 2003, 27 pages.

Francisco Romero, Patent Application (49 pages of specification, claims and abstract, and 4 sheets of drawings), "Dynamic Adaptive Srver Provisioning for Blade Architectures".

"Apparatus and Method to Automatically Activate a Reserve Resource", U.S. Appl. No. 09/709,705 (22 pages of specification, claims and abstracts, and 5 sheets of drawings), filed Nov. 9, 2000.

Clifford A. McCarthy, et al., "Dynamic Management of Virtual Partition Computer Workloads through Service Level Optimization", U.S. Appl. No. 10/206,594 (27 pages of specification, claims and abstract, and 5 sheets of drawings), filed Jul. 26, 2002.

Clifford A. McCarthy, et al., "Dynamic Management of Computer Workloads through Service Level Optimization", U.S. Appl. No. 09/493,753 (36 pages of specification, claims and abstract, and 7 sheets of drawings), filed Jan. 28, 2000.

Paul Henry Bouchier, et al., "Reconfiguration Support for a Multi Partition Computer System", U.S. Appl. No. 09/562,590 (37 pages of specification, claims and abstract, and 4 sheets of drawings), filed Apr. 29, 2000.

Search Report, Application No. GB 0415283.1, Nov. 15, 2004, one page.

* cited by examiner

SYSTEMS AND METHODS FOR MONITORING RESOURCE UTILIZATION AND APPLICATION PERFORMANCE

BACKGROUND OF THE INVENTION

A significant challenge in the modern datacenter is to ensure that enough resources, such as computer servers, are available to each application or application component in the data center when there is a sudden peak in demand for the application. The problem becomes compounded for aggregate application, which are deployed on a multi-tier architecture, requiring one or more servers for each tier. For example, an aggregate application may include one or more Web servers for clients of the application to connect to, a set of applications servers that implement the business logic of the application, and one or more database servers to manipulate the data required by the application. Enough resources must be provided at each tier to meet the performance goals of the aggregate application.

Multiple application components may also be consolidated on a shared resource. This makes it possible to increase utilization of the shared resource. However, application components may be allocated a larger percentage of the shared resource than needed in order to meet peak demand requirements.

SUMMARY OF THE INVENTION

Systems and methods are disclosed for monitoring application resource utilization and application performance. In one embodiment, a system comprises resource data, application data, policy data, and a monitoring agent. The resource data includes information on a plurality of resources and the resources include a plurality of computers. Application data includes one or more application profiles. Each of the application profiles has a performance profile and a resource profile. The resource profile includes resource utilization information. The policy data includes one or more application performance policies and one or more resource utilization policies. Finally, the monitoring agent monitors application data for compliance with the policy data.

In another embodiment, a method for dynamically monitoring and managing application performance is disclosed. The method includes monitoring application data for compliance with one or more performance policies. The application data includes one or more application profiles, each of which has a performance profile and a resource profile. The resource profile includes resource utilization information associated with an application. The applications each execute in a container associated with a domain. The domains each include one or more resources and the resources include a plurality of computers. In response to a policy violation, the policy is automatically enforced by reallocating how resources are mapped to containers.

BRIEF DESCRIPTION OF THE DRAWINGS

Illustrative embodiments of the invention are illustrated in the drawings in which.

DETAILED DESCRIPTION

Figure 1:
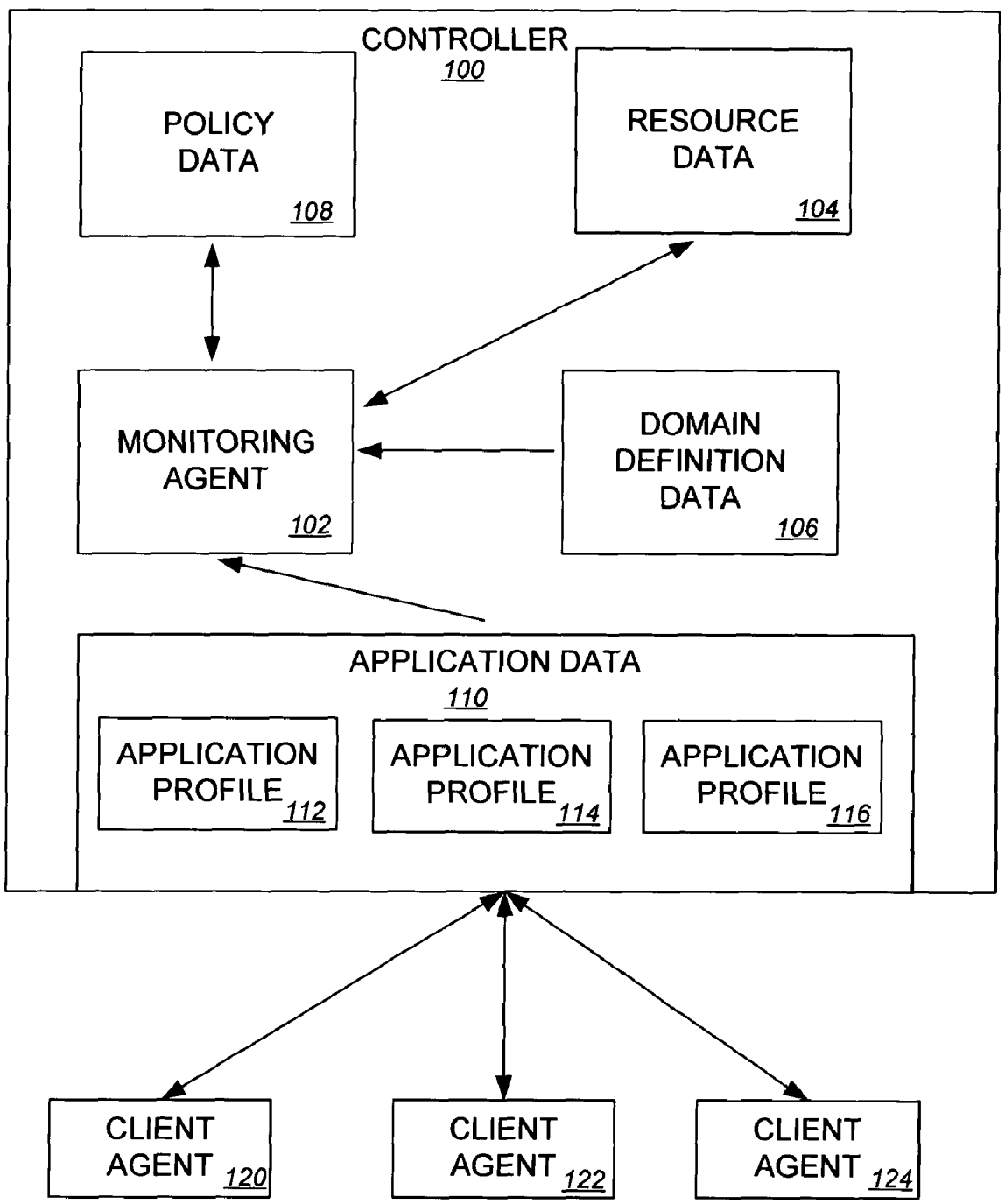
FIG. 1 illustrates one embodiment of a system for monitoring application performance.

An exemplary system for monitoring application performance across multiple resources is illustrated in FIG. 1. A controller 100 includes resource data 104. Resource data 104 contains information on a plurality of resources. Resources may include a plurality of computers, such as servers, or blades in a rack and blade architecture. Resources may also include other types of compute resources, such as partitions within a server, and other devices, such as load balancers, firewalls, and network switches. By way of example, resource data 104 may include information on the capacity of the resource, the network address of the resource, and how to instantiate (initialize, boot, and configure) the resource.

Controller 100 also includes application data 110. Application data includes one or more application profiles 112, 114, 116. An application may be a single application, a replicated application, or an aggregate application. A replicated application may be a set of replicated instances of a single application, which together perform a single function. By way of example, a replicated application may be a Web server farm or a replicated database application, such as Oracle®'s Real Application Clusters(RAC). An aggregate application may be a combination of multiple single and/or replicated applications across multiple tiers.

In one embodiment, application profiles 112-116 may include one or more of a resource profile, and a performance profile. A resource profile may include resource demand information on the amount of resources an application requires and resource utilization information. The resource utilization information may include resource allocation information on the amount of resources an application is currently assigned, and/or resource consumption information on the amount of resources an application is using or has used over a period of time. By way of example, information on CPU, memory, I/O, network percentages or absolute consumption for an application may be tracked over a period of time and stored in a resource profile. A performance profile may include information on application performance at the application or user level, such as response time. Finally, a demand profile may measure the internal activity of an application. It should be appreciated that application profiles 112-116 may also include additional information, such as a relative priority of an application and its components, details on how performance is to be monitored, or instructions on how to install and configure the application.

In one embodiment, applications may be associated with a container. A container may be a logical computer where an application or application component resides. A container may have its own copy of an operating system, or it might be implemented within an operating system. By way of example, a container may be an unpartitioned server running a single application, a hardware partition, a software-based partition, a processor set, a sub-CPU resource partition (partitions of a single CPU resource), multiple nodes of a cluster, or other set or unit of computer resources.

Controller 100 may receive performance information for an application profile 112-116 from a plurality of client agents 120, 122, 124. Each client agent may run on an operating system instance on a resource and may monitor the performance of applications running on the operating system instance. It should be appreciated that in alternate embodiments, the performance information for an application profile may be obtained with an alternate method.

Policy data 108 is also accessible to controller 100. Policy data 108 may include one or more performance policies associated with an application or application component. By way of example, an application policy may be that an average response time per transition for the application component is 2 seconds 95% of the time. Policy data may also include one or more resource utilization policies associated with a resource, an application, or a container. For example, a utilization policy may be that the maximum utilization allowed for a container or a resource is 80%. Other performance and resource utilization policies are also contemplated. Additionally, in some embodiments, one or more of the policies may be assigned a relative priority.

Controller 100 additionally includes monitoring agent 102 to monitor the application data for compliance with the policy data. In one embodiment, the monitoring agent may provide advisory information about potential actions that can be taken to maintain or restore compliance with application performance or utilization policies. As will be described in further detail below, in other embodiments, the monitoring agent may adjust resources (e.g., allocate, reallocate, or deallocate them) to enforce policies.

Controller 100 additionally includes domain definition data 106. The domain definition data includes information on one or more domains. Each domain contains a grouping of resources, such as one or more computers or containers, which provide a shared pool to be shared by one or more applications or application components. By way of example, a domain may consist of hyper-text transfer protocol (HTTP) servers, all of which may share the job of providing web access to several applications. The domain definition data may also include resource utilization information for one or more of the domains. In one embodiment, the monitoring agent may monitor the domain resource utilization information and provide advisory information about potential actions that can be taken to maintain or restore resource utilization to comply with domain policies. In other embodiments, the monitoring agent may dynamically adjust resources to enforce domain policies.

Although FIG. 1 depicts a controller 100 including the various components described above, it should be appreciated that alternate embodiments of these components may be combined or may reside at different physical locations. For example, resource data may reside in a database accessible to controller 100 and application data may reside in a different database. Alternately, domain definition data, resource data, and application data may be combined into one database of information.

Figure 2:
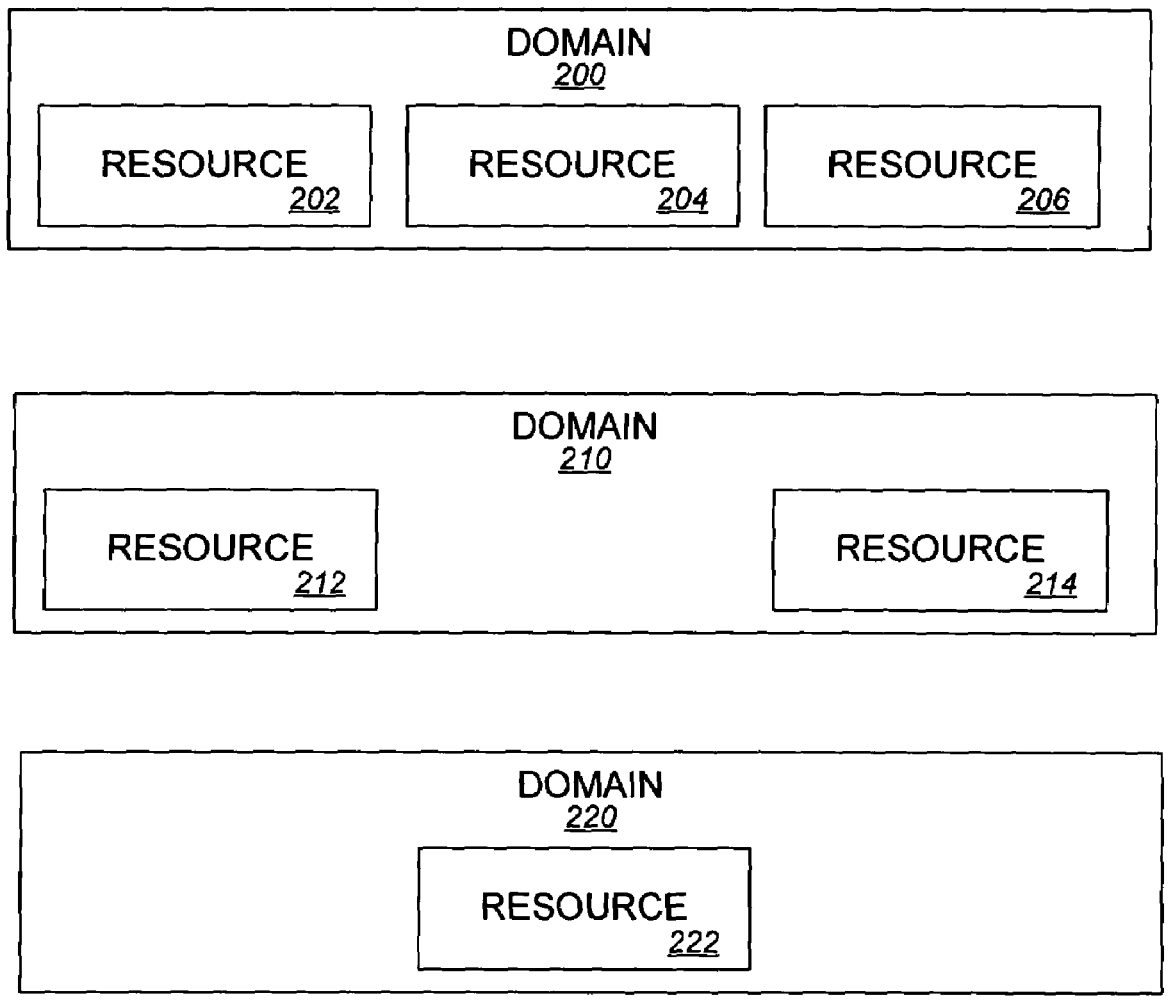
FIG. 2 illustrates an exemplary grouping of resources into domains that may be monitored by the controller of FIG. 1.

FIG. 2 illustrates an exemplary grouping of resources into domains 200, 210, 220. Domain 200 includes three resources 202, 204, 206. By way of example, resources 202-206 may be servers, nodes in a cluster, blade servers in a rack and blade architecture, or other type of computer resource. Domain 210 includes two resources 212, 214, which may also be servers, nodes in a cluster, blade servers, or other type of computer resource. Domain 220 contains a single resource 222 which, by way of example, may be a nested resource, such as a partitioned Hewlett Packard Superdome computer. Monitoring agent 102 may expand a resource domain if the domain has a need for additional resources or may contract a domain if a domain has extra unused capacity. By way of example, domains may be expanded by using capacity-on-demand-processors or obtaining a server or blade from a staging area. As will be described in further detail below, resources may also be arbitrated (e.g., determining how resources are allocated to containers) across a domain. Expansion and arbitration information may be included in policy data 108, domain definition data 106, or another location.

Figure 3:
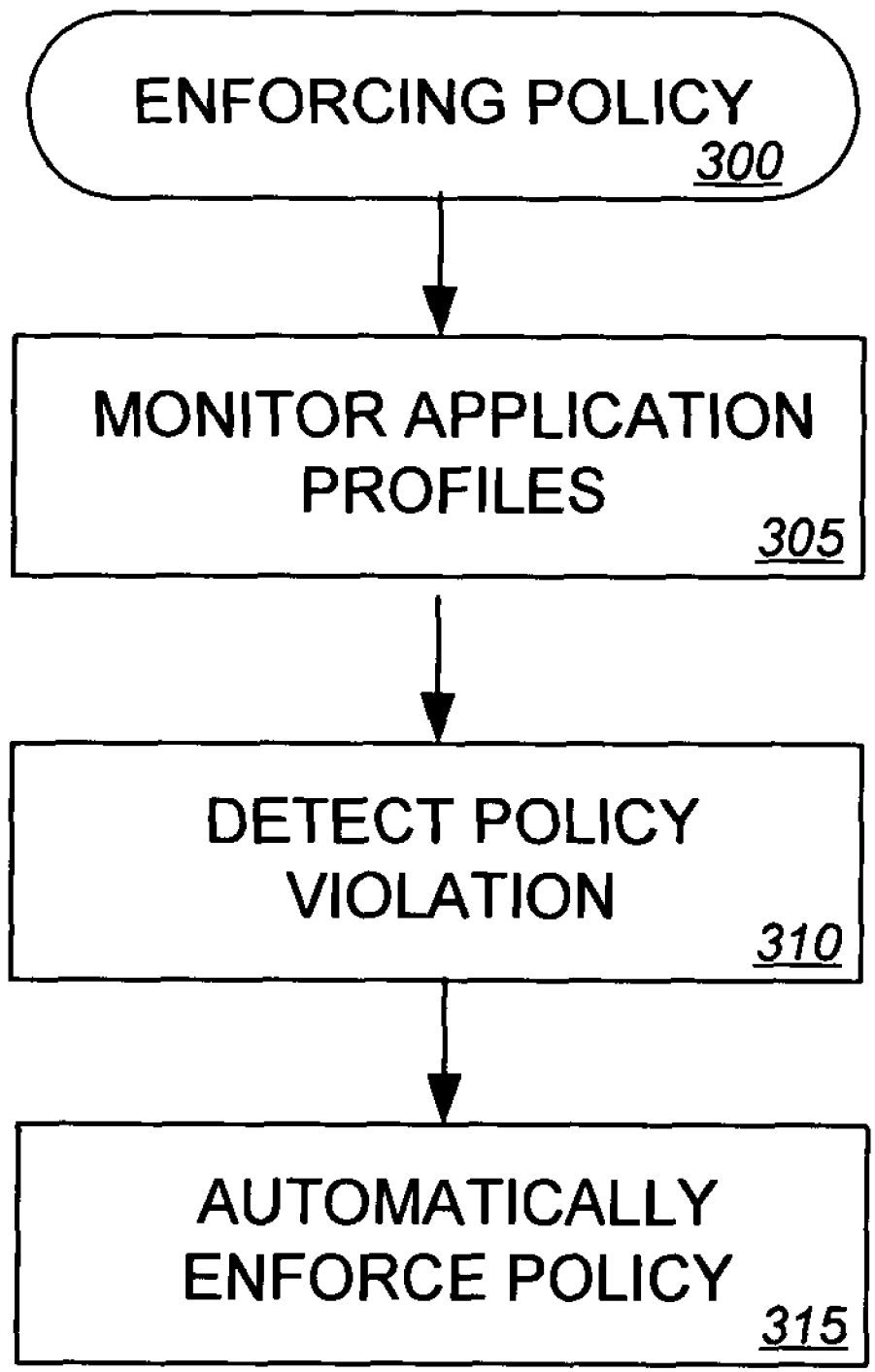
FIG. 3 is a flow diagram illustrating an exemplary method for enforcing a policy that may be used by the controller of FIG. 1.
Figure 4A:
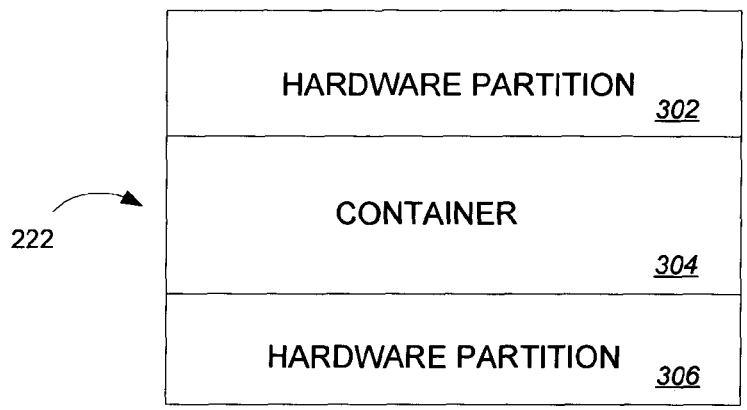
FIG. 4A illustrates an exemplary partitioning of a server into multiple hardware partitions, one of which is container for an application that may be monitored by the controller of FIG. 1.
Figure 4B:
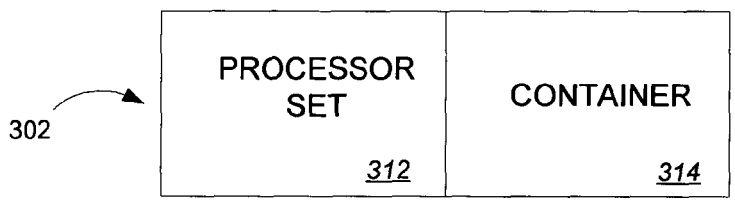
FIG. 4B illustrates an exemplary further partitioning of one of the hardware partitions of FIG. 4A into multiple processor sets, one of which is a container for an application.
Figure 4C:
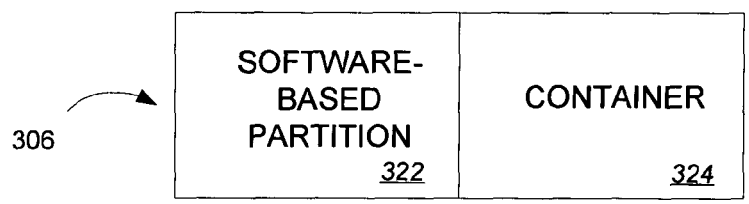
FIG. 4C illustrates an exemplary further partitioning of one of the network partitions of FIG. 4A into multiple software-based partitions, one of which is a container for an application.
Figure 4D:
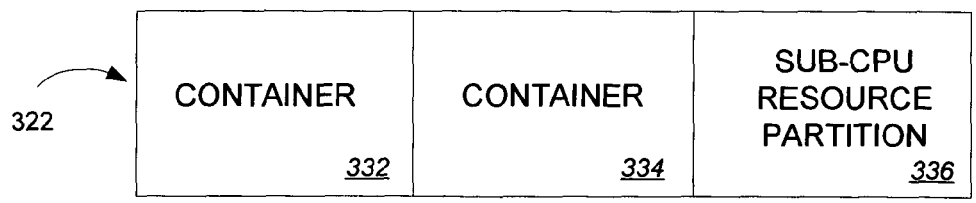
FIG. 4D illustrates an exemplary further partitioning of one of the software-based partitions of FIG. 4C into multiple sub-cpu resource partitions, two of which are containers for an application.

In some embodiments, controller 100 may perform automatic arbitration within a resource domain to enforce one or more policies. One method that may be used to enforce policies 300 is illustrated in FIG. 3. As previously described, monitoring agent 102 monitors 305 one or more application profiles 112-116 for compliance with the policy data 108. If monitoring agent detects a policy violation 310 or anticipated policy violation, one or more actions associated with the policy may be taken to automatically enforce the policy 315. These actions may include expanding a domain by adding more resources to the domain or performing arbitration within a domain. In cases where a policy cannot be enforced, policies may be arbitrated using their associated priorities and a message may be provided to a user that a lower priority policy cannot be met.

One method that may be used to enforce policies can be described with reference to FIGS. 4A-4D and 5. FIGS. 4A-4D illustrate an exemplary partitioning of a server into multiple partitions. Resource 222 may be partitioned into multiple hardware partitions 302-306. A hardware partition (e.g., Hewlett Packard's nPars) may run its own copy of an operating system and may be electrically isolated from other hardware partitions. One or more of the hardware partitions may provide a container 304 for an application.

Hardware partition 302 may be further partitioned into processor sets 312,314, one or more of which may be a container for an application 314. A processor set may be a resource partition implemented within a single copy of the operating system that contains one or more CPUs. Additionally, hardware partition 306 may be partitioned into multiple software-based partitions 322, 324. A software-based-based partition (e.g., Hewlett Packard's vPars) may be a partition that is implemented in software and has its own copy of the operating system but is not electrically isolated from other software-based partitions. One of the software-based partitions may be associated with a container for an application 324. Another software-based partition 322 may be further divided into sub-CPU resource partitions 332-336 to apportion fractions of CPU resources. One or more of the sub-CPU resource partitions may each be associated with containers 332, 334 to execute an application.

To enforce a policy 315A associated with an application or container 332, a container 332 may be expanded 505 by reallocating how resources are mapped to the container.

Resources may be reallocated by resizing one or more of the partitions. By way of example, container 332 may be expanded to include a larger percentage of the CPU resources. Software-based partition 322 and/or hardware partition 306 may also be resized to enforce one or more policies associated with container 332 or the application running in container 332. Similarly, partitions may be resized at various levels of the server to enforce or meet policies for containers 304, 314, 324, 332, 334, or applications running in the containers.

An alternate method that may be used to enforce policies 315 can be described with reference to FIGS. 6 and 7. FIG. 7 illustrates a domain that consists of a cluster. The cluster includes two containers 710, 720, each of which is associated with an application. Container 710 includes nodes 712, 714, 716. Container 720 includes nodes 722, 724. By way of example, container 710 may host Web servers and container 720 may be hosting batch workloads. Container 720 may only be currently using node 724 to execute the batch workloads.

To enforce a policy 315B associated with the Web server application, the monitoring agent 102 may transfer node 722 from container 720 to container 710. Any applications running on node 722 may be shut down so that the Web server application can be instantiated on node 722. The instructions on how to instantiate the Web server application may be located in an application profile 112 associated with the Web server application.

Figure 5:
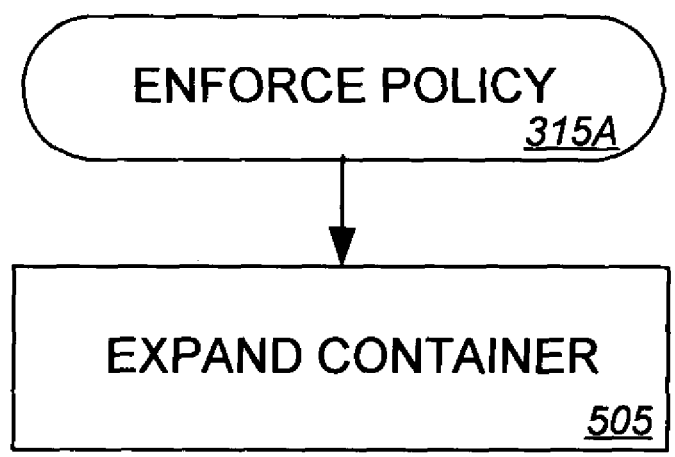
FIG. 5 is a flow diagram illustrating an exemplary method for enforcing a policy that may be used by the controller of FIG. 1 to enforce a policy on the server of FIGS. 4A-D.
Figure 6:
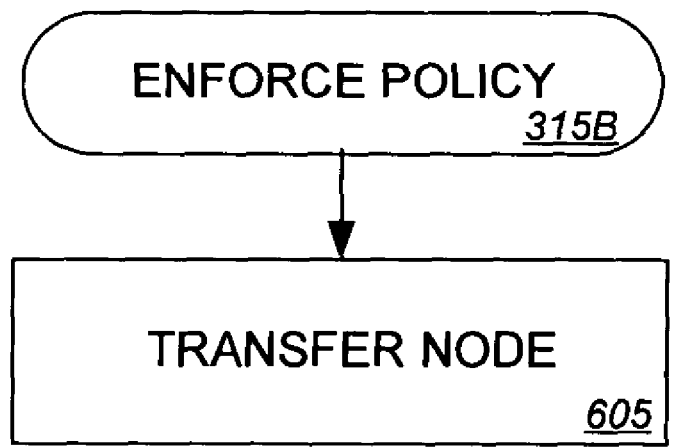
FIG. 6 is a flow diagram illustrating an exemplary method for enforcing a policy that may be used by the controller of FIG. 1 to enforce a policy in a cluster domain.
Figure 7:
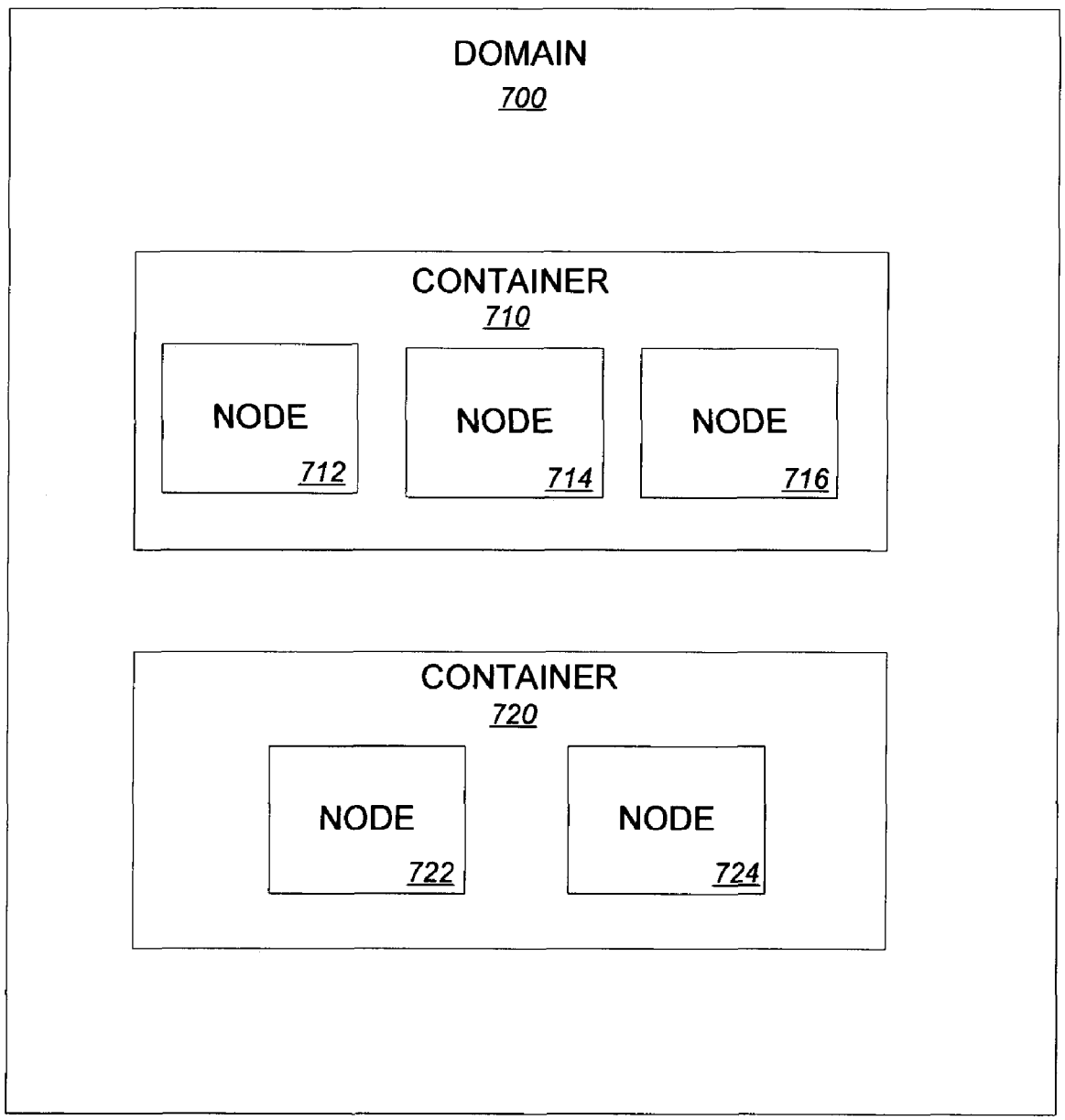
FIG. 7 illustrates one embodiment of a domain implemented in a cluster environment that may be monitored by the controller of FIG. 1.

It should be appreciated that the methods described above may be performed by hardware components or may be embodied in sequences of machine-executable instructions, which may be used to cause a machine, such as a general-purpose or special-purpose processor or logic circuits programmed with the instructions to perform the actions set forth in FIGS. 3, 5 and 6. Alternatively, the methods may be performed by a combination of hardware and software or the instructions could be partially or wholly integrated into the controller 100 shown in FIG. 1.

What is claimed is:

1. A system comprising:
   a processor that executes instructions of a monitoring agent to monitor application data for compliance with policy data;
   storage that is accessed due to the instructions executing on the processor, wherein the storage stores:
   resource data, the resource data including information on a plurality of resources, the resources including a plurality of computers;
   the application data including one or more application profiles, each application profile having a performance profile and a resource profile, the resource profile including resource utilization information, wherein one or more of the application profiles further includes instructions for installing an associated application;
   the policy data including one or more application performance policies and one or more resource utilization policies; and
   domain definition data including information on a plurality of domains where each domain includes a subset of the resources, wherein resources associated with a single domain are allocated for different types of applications.

2. The system of claim 1, wherein at least one of the applications comprises an aggregate application executing on at least two of the computers.

3. The system of claim 1, wherein the monitoring agent is further to perform arbitration within a domain grouping one or more of the computers in response to a violation of one of the application and resource utilization policies.

4. The system of claim 1, wherein the monitoring agent is further to expand a domain grouping one or more of the computers in response to a policy violation.

5. The system of claim 1, wherein the monitoring agent is further to contract a domain grouping one or more of the computers.

6. The system of claim 1, further comprising the domain definition data, the domain definition data including information on the plurality of domains, each domain comprising a grouping of one or more of the computers, one or more of the domains being a cluster.

7. The system of claim 6, wherein the cluster comprises a first container executing a set of replicated instances of an application on a first set of nodes and a second container having a second set of nodes.

8. The system of claim 7, wherein the monitoring agent is further to transfer a node from the second container to the first container in response to a violation of one of the policies.

9. The system of claim 1, further comprising the domain definition data having information on the plurality of domains, each domain comprising a grouping of one or more of the computers, the domain definition data further including information on the resource utilization of a domain.

10. The system of claim 1, wherein the resource profile further includes resource demand information on the amount of resources an application requires.

11. The system of claim 1, wherein the resource utilization information includes resource consumption information on the amount of resources an application is currently assigned.

12. The system of claim 1, wherein the resource utilization information includes at least one of resource consumption information on the amount of resources an application is currently using, and resource consumption information on the amount of resources an application has used over a period of time.

13. The system of claim 1, wherein one of the computers is associated with a container to execute one of the applications.

14. The system of claim 1, wherein one of the computers is associated with a plurality of containers, each container to execute one of the applications.

15. The system of claim 14, wherein the policy data further includes one or more container utilization policies, each utilization policy associated with one of the containers.

16. The system of claim 14, wherein at least one of the containers is a partition.

17. The system of claim 16, wherein the monitoring agent is further to resize the partition in response to a violation of one of the policies.

18. The system of claim 16, wherein the partition is a hardware partition.

19. The system of claim 16, wherein the partition is a software-based partition.

20. The system of claim 14, wherein at least one of the containers is a processor set.

21. The system of claim 14, wherein at least one of the containers is a sub-CPU resource partition.

22. The system of claim 1, wherein the performance information includes response time.

23. The system of claim 22, wherein the instructions for the installing of the associated application further include instructions for configuring the associated application.

24. The system of claim 1, wherein one or more of the application profiles includes resource allocation information for the associated application.

25. The system of claim 1, wherein the performance policies have a relative associated priority.

26. A method comprising:

monitoring application data, for compliance with one or more performance policies, the application data including one or more application profiles, each application profile having a performance profile and a resource profile, wherein one or more of the application profiles further includes instructions for installing an associated application, the resource profile including resource utilization information associated with an application, each application executing in a container associated with a domain, each domain including a subset of resources, the resources including a plurality of computers, wherein resources associated with a single domain are allocated for different types of applications;

in response to a policy violation, automatically enforcing the policy by expanding a first one of the containers.

27. The method of claim 26, wherein the first container comprises a partition and expanding the first container comprises resizing the partition.

28. The method of claim 26, wherein the domain associated with the first container comprises a cluster.

29. The method of claim 28, wherein expanding the first container comprises transferring a node associated with a second container, the second container being in the domain associated with the first container, to the first container.

30. The method of claim 26, further comprising in response to a second policy violation, providing a message to a user.

31. The method of claim 30, wherein the message comprises a message that a lower priority policy cannot be met.

* * * * *